US010641113B2

(12) United States Patent
Fukuda et al.

(10) Patent No.: US 10,641,113 B2
(45) Date of Patent: May 5, 2020

(54) AIRFOILS (71) Applicant: UNITED TECHNOLOGIES CORPORATION, Farmington, CT (US)

(72) Inventors: Takao Fukuda, East Hartford, CT (US); Scott D. Hartmann, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 704 days.

(21) Appl. No.: 14/681,195

(22) Filed: Apr. 8, 2015

(65) Prior Publication Data
US 2016/0298470 A1    Oct. 13, 2016

(51) Int. Cl.
F01D 9/02    (2006.01)
F01D 5/14    (2006.01)
F01D 9/04    (2006.01)

(52) U.S. Cl.
CPC ............. F01D 9/02 (2013.01); F01D 5/141 (2013.01); F01D 9/041 (2013.01); F05D 2230/21 (2013.01); F05D 2240/122 (2013.01); F05D 2240/123 (2013.01); F05D 2240/129 (2013.01); F05D 2250/713 (2013.01); F05D 2250/74 (2013.01); Y02T 50/673 (2013.01)

(58) Field of Classification Search
CPC . F01D 9/02; F01D 9/041; F01D 5/141; F01D 5/14; F01D 5/148; F01D 5/18; F05D 2240/129; F05D 2240/123; F05D 2240/122; F05D 2250/713; F05D 2250/74; F05D 2230/21; F05D 2230/10; Y02T 50/673
See application file for complete search history.

(56) References Cited

U.S. PATENT DOCUMENTS

| 3,873,234 | A | * | 3/1975 | Penny | F01D 5/021 29/889.21 |
| 4,168,938 | A | * | 9/1979 | Dodd | F01D 5/188 415/115 |
| 4,664,597 | A | * | 5/1987 | Auxier | B23H 9/10 415/115 |
| 5,102,299 | A | * | 4/1992 | Frederick | F01D 5/186 415/115 |

(Continued)

FOREIGN PATENT DOCUMENTS

| DE | 102004009696 B3 | 8/2005 |
| EP | 1057971 A1 | 12/2000 |

(Continued)

OTHER PUBLICATIONS

EP SR, 16164320.0, dated Aug. 17, 2016, 9 pages.

Primary Examiner — David E Sosnowski
Assistant Examiner — Wayne A Lambert
(74) Attorney, Agent, or Firm — Cantor Colburn LLP (57) ABSTRACT

An airfoil cluster includes an inner diameter platform and an outer diameter platform. A plurality of airfoils extend radially from the inner diameter platform to the outer diameter platform. Each airfoil has a leading edge and a trailing edge, and pressure and suction sides between the leading and trailing edges. At least one of the airfoils includes a recessed portion on the pressure side adjacent to the trailing edge.

10 Claims, 4 Drawing Sheets

(56) References Cited

U.S. PATENT DOCUMENTS

| | | | | |
|---|---|---|---|---|
| 5,228,833 | A * | 7/1993 | Schonenberger | F01D 5/141 415/181 |
| 6,328,531 | B1 * | 12/2001 | Bariaud | F01D 5/141 416/97 R |
| 6,551,062 | B2 * | 4/2003 | Leeke | F01D 5/186 415/115 |
| 7,258,528 | B2 * | 8/2007 | Trindade | F01D 5/18 416/224 |
| 7,670,112 | B2 * | 3/2010 | Boury | F01D 5/18 416/96 R |
| 2009/0016871 | A1 * | 1/2009 | McCaffrey | F01D 5/145 415/115 |
| 2010/0329847 | A1 * | 12/2010 | Yamashita | F01D 5/16 415/115 |

FOREIGN PATENT DOCUMENTS

| | | |
|---|---|---|
| EP | 1106782 A2 | 6/2001 |
| FR | 2417640 A1 | 9/1979 |
| GB | 2036884 A | 7/1980 |
| WO | 2002038330 A1 | 5/2002 |

* cited by examiner

AIRFOILS

BACKGROUND OF THE INVENTION

1. Field of the Invention

The present disclosure relates to airfoils, and more particularly to vanes for gas turbine engines.

2. Description of Related Art

A typical gas turbine engine includes a compressor, a combustor, and a turbine. Airflow entering the compressor is compressed and directed to the combustor where it is mixed with fuel and ignited, producing hot combustion gases used to drive the turbine. Traditionally, gas turbine engines can include multiple stages of airfoils to condition and guide airflow through the compressor and/or turbine sections.

Vanes can be assembled into respective stages in a variety of configurations, for example, as clusters or individually. Clusters refer to a plurality of vanes affixed to the same inner and outer diameter platforms. Vanes have requirements for total flow area between all of the vanes in a particular stage as well as requirements for flow area for each gap between two vanes. Typically, these requirements are met by cold working the vanes post casting to fine tune the flow area.

Such conventional methods and systems have generally been considered satisfactory for their intended purpose. However, there is still a need in the art for improved vanes. The present disclosure provides a solution for this need.

SUMMARY OF THE INVENTION

An airfoil cluster includes an inner diameter platform and an outer diameter platform. A plurality of airfoils extend radially from the inner diameter platform to the outer diameter platform. Each airfoil has a leading edge and a trailing edge, and pressure and suction sides between the leading and trailing edges. At least one of the airfoils includes a recessed portion on the pressure side adjacent to the trailing edge.

It is contemplated that the recessed portion can include a recessed surface. The trailing edge can be an arcuate surface connecting between the suction side and the recessed surface of the pressure side. The recessed surface can be tangent to the arcuate surface of the trailing edge. The pressure side can include a substantially flat non-recessed surface and a substantially flat recessed surface with a transition surface therebetween. Both of the substantially flat surfaces can be proximate to the trailing edge. The substantially flat recessed surface can be part of the recessed portion and can be at an angle with respect to the substantially flat non-recessed surface. The plurality of vanes can range from two to six hollow vanes, for example the plurality airfoils can include three hollow vanes.

An exterior surface of at least one of the airfoils can be formed in substantial conformance with a set of Cartesian coordinates set forth in one of Table 1, Table 2 or Table 3. The Cartesian coordinates are provided by an axial coordinate scaled by a local chord length, a circumferential coordinate scaled by the local chord length, and a span location, wherein the local chord length corresponds to a respective width of each airfoil between the leading and trailing edges at 50% span.

In another aspect, a method for adjusting flow area between airfoils in a cluster includes casting an airfoil cluster. The airfoil cluster is similar to the airfoil cluster described above. Manufacturing an airfoil cluster includes generating a recessed portion on the pressure side of at least one of the airfoils adjacent to the trailing edge to adjust a throat distance between at least two of the airfoils.

Generating the recessed portion can include generating the recessed surface of each airfoil tangent to the respective arcuate surface of the trailing edge of each airfoil. Generating the recessed portion can include generating a substantially flat recessed surface at an angle with respect to a substantially flat non-recessed surface with a transition surface therebetween. The substantially flat non-recessed surface, the substantially flat recessed surface and the transition surface can be similar to the surfaces described above. Manufacturing an airfoil cluster can include generating an exterior surface of at least one of the airfoils in substantial conformance with the set of Cartesian coordinates set forth in at least one of Table 1, Table 2 or Table 3, described above. Generating the recessed portion can include at least one of casting or machining.

An airfoil includes an airfoil body having a leading edge and a trailing edge with an exterior surface therebetween, wherein the exterior surface includes a recessed portion on a pressure side of the airfoil adjacent to the trailing edge. The exterior surface can be formed in substantial conformance with the set of Cartesian coordinates set forth in at least one of Table 1, Table 2 or Table 3, described above. Substantial conformance with the set of Cartesian coordinates set forth in Tables 1, 2 and 3 can include values within ±15% of each coordinate. A manufacturing tolerance relative to the set of Cartesian coordinates can be ±3.6% of the local chord length of the airfoil body. The recessed portion can include a recessed surface, as described above. The pressure side can include the substantially flat non-recessed surface, the substantially flat recessed surface, and the transition surface, as described above. The airfoil body can be a hollow vane.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
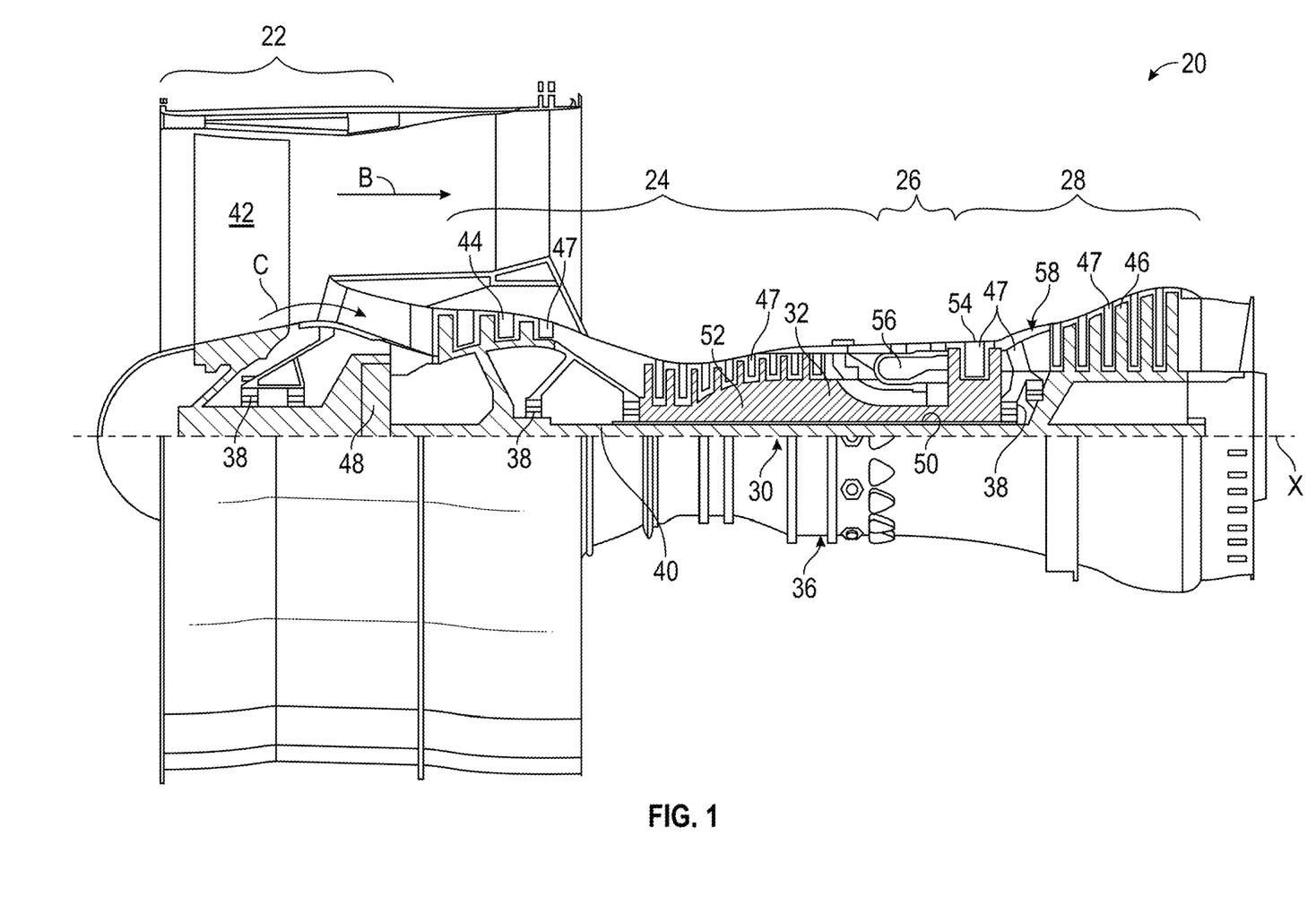
FIG. 1 is a schematic cross-sectional side elevation view of an exemplary embodiment of a gas turbine engine constructed in accordance with the present disclosure.

Reference will now be made to the drawings wherein like reference numerals identify similar structural features or aspects of the subject disclosure. For purposes of explanation and illustration, and not limitation, a cross-sectional side elevation view of an exemplary embodiment of a gas turbine engine accordance with the disclosure is shown in FIG. 1 and is designated generally by reference character 20. Other embodiments of gas turbine engines in accordance with the disclosure, or aspects thereof, are provided in FIGS. 2-6, as will be described. Airfoils shown and described herein provide control over throat distance T, thereby providing increased control over flow area between airfoils, with little to no change to the chord length Y.

As shown in FIG. 1, a gas turbine engine 20 is schematically shown. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, low-bypass two-spool architectures, turbojet engines, and the like.

With continued reference to FIG. 1, the exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. Mid-turbine frame 58 includes an inner case and supports bearing systems 38 in the turbine section 28. The inner shaft 40 and the outer shaft 50 are concentric and rotate via bearing systems 38 about the engine central longitudinal axis A which is collinear with their longitudinal axes. While described herein as a geared fan, embodiments of the present disclosure can be used in non-geared fan engines as well.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 58 includes airfoils 47 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second. While described above in the context of a flight engine, those skilled in the art will readily appreciate that embodiments of the present invention can be used in a variety of engines, for example, land based engines used for industrial purposes, such as power generation, pumping fluids, and the like.

Figure 2:
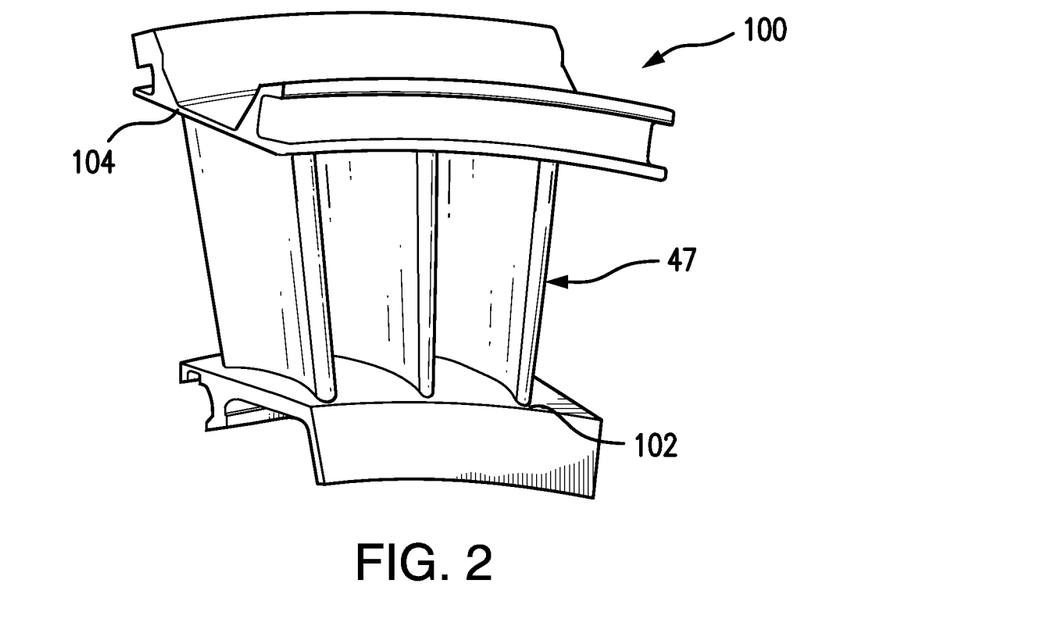
FIG. 2 is a perspective view of an embodiment of a vane cluster constructed in accordance with the present disclosure, showing inner and outer diameter platforms with airfoils therebetween.

Now with reference to FIGS. 1 and 2, gas turbine engine 20 includes a variety of airfoils 47. This includes both rotating blades and stator vanes. An airfoil cluster 100 includes an inner diameter platform 102 and an outer diameter platform 104. A plurality of airfoils 47, e.g. vanes, extend radially from inner diameter platform 102 to outer diameter platform 104. Those skilled in the art will readily appreciate that while three vanes are shown, airfoil cluster 100 can include any number of vanes, for example, ranging from two to six vanes 47. Additionally, those skilled in the art will readily appreciate that vanes 47 can be hollow, and/or variable, and vanes 47 can be made from metallic or ceramic materials, or combinations thereof.

Figure 3:
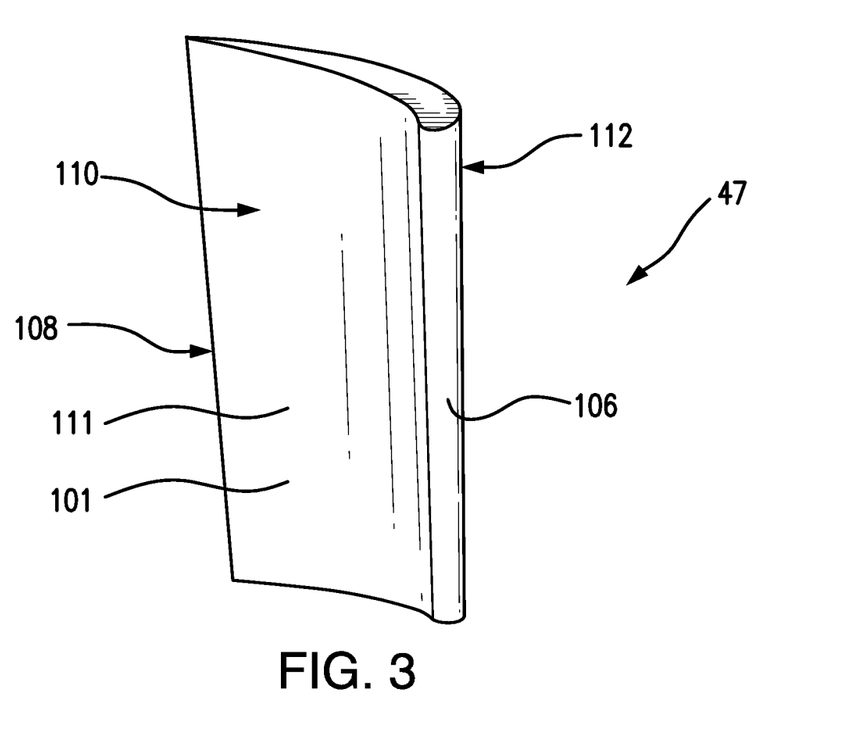
FIG. 3 is a perspective view of an embodiment of one of the vanes of FIG. 2, showing the leading and trailing edges of the vane.

As shown in FIG. 3, each vane 47 includes a leading edge 106 and a trailing edge 108. Each vane 47 includes an airfoil body 101 that defines an exterior surface 111. Each vane 47 includes a pressure side 110 and a suction side 112 between leading and trailing edges, 106 and 108, respectively. Exterior surface 111 is formed in substantial conformance with the set of Cartesian coordinates set forth in at least one of Table 1, Table 2 or Table 3, described below.

Figure 4:
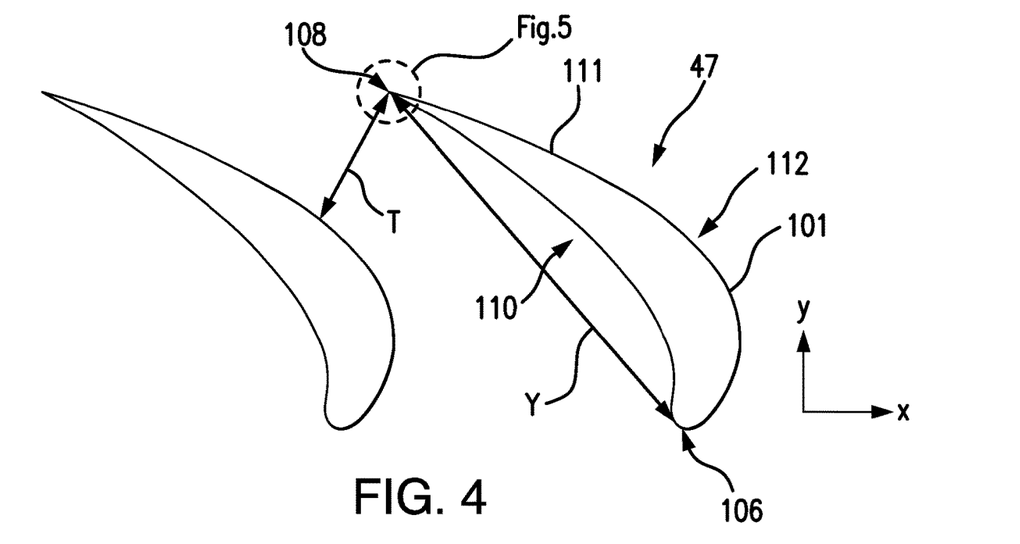
FIG. 4 is a schematic plan view of two of the vanes of FIG. 2, showing the chord length of one of the vanes.
Figure 5:
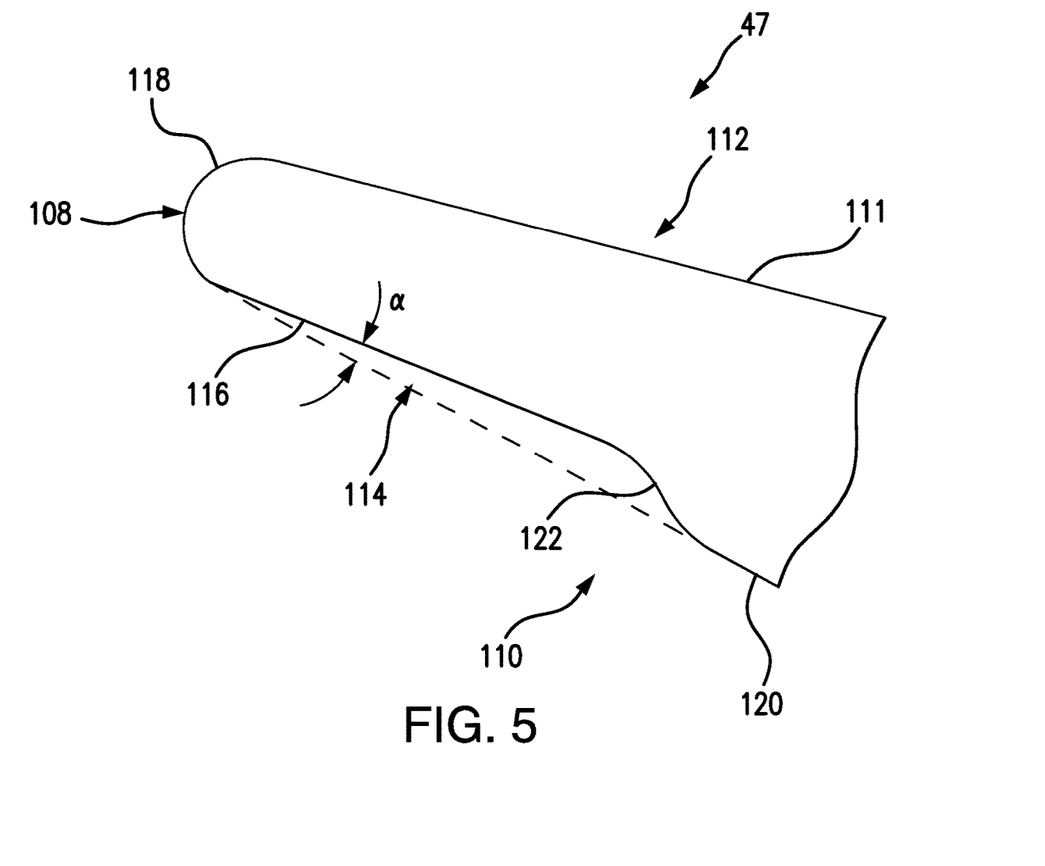
FIG. 5 is a schematic plan view of a portion of one of the vanes of FIG. 2, showing the recessed portion.

As shown in FIGS. 4-5, each vane 47 includes a recessed portion 114 on pressure side 110 adjacent to trailing edge 108. Recessed portion 114 includes a recessed surface 116. Trailing edge 108 is an arcuate surface 118 connecting between suction side 112 and recessed surface 116 of pressure side 110. Recessed surface 116 is tangent to arcuate surface 118 of trailing edge 108. Recessed surface 116 is substantially flat. Pressure side 110 includes a substantially flat non-recessed surface 120 and with a transition surface 122 therebetween. Transition surface 122 is a continuously curved "S" shaped surface. While shown as continuously curved, those skilled in the art will readily appreciate that transition surface 122 can also be a flat surface with curved transitions between surfaces 116 and 120, or the like. Both of the substantially flat surfaces, 116 and 120, are proximate to trailing edge 108. Substantially flat recessed surface 116 is part of recessed portion 114 and is at an angle $\alpha$ with respect to substantially flat non-recessed surface 120. It is contemplated that angle $\alpha$ can vary depending on the flow area change required for a given application.

Figure 6:
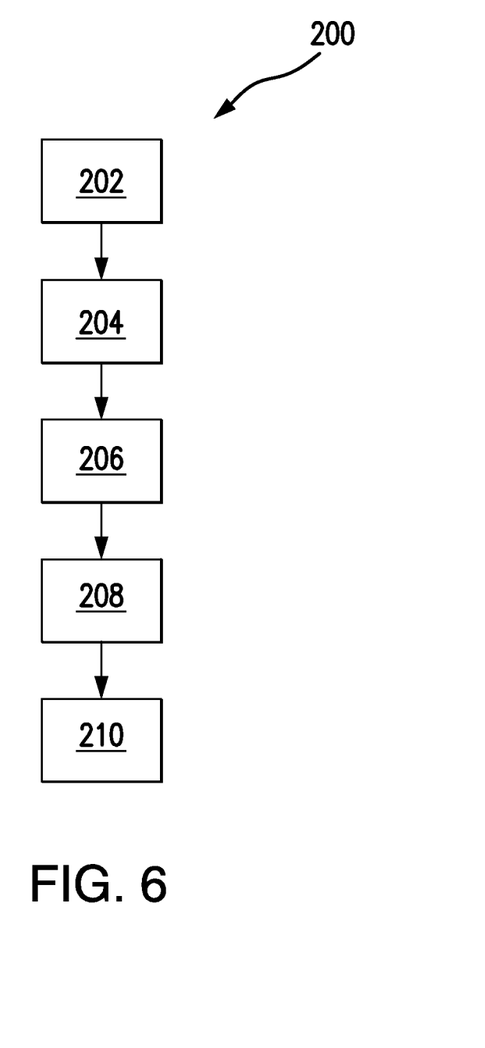
FIG. 6 is a flowchart of an exemplary method for adjusting flow area between airfoils in a cluster in accordance with the invention.

As shown in FIG. 6, a method 200 for adjusting flow area between airfoils, e.g. airfoils 47, in a cluster, e.g. cluster 100, includes casting an airfoil cluster, as indicated schematically by box 202. Method 200 includes generating a recessed portion, e.g. recessed portion 114, on pressure side 110 of at least one of the airfoils adjacent to the trailing edge to adjust a throat distance between at least two of the airfoils, as indicated schematically by box 204. Generating the recessed portion includes generating a recessed surface, e.g. recessed surface 116, of each airfoil tangent to the respective arcuate surface of the trailing edge of each airfoil, as indicated schematically by box 206.

With continued reference to FIG. 6, generating the recessed portion includes generating a substantially flat recessed surface, e.g. surface 116, at an angle with respect to a substantially flat non-recessed surface, e.g. substantially flat non-recessed surface 120, with a transition surface, e.g. transition surface 122, therebetween, as indicated schematically by box 208. Manufacturing the airfoil cluster includes generating an exterior surface of at least one of the airfoils in substantial conformance with the set of Cartesian coordinates set forth in at least one of Table 1, Table 2 or Table 3, described below, as indicated schematically by box 210. Generating the recessed portion includes at least one of casting or machining, for example, the airfoil can be cast and then have the recessed portion machined in afterward, or the recessed portion can be cast along with the rest of the airfoil.

Those skilled in the art will readily appreciate that substantial conformance is based on a determination by a national or international regulatory body, for example, in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade or vane, or that the part or structure is sufficiently the same with respect to a part design in a type-certified or type-certificated airfoil, blade or vane, such that the part or structure complies with airworthiness standards applicable to the specified blade, vane or airfoil. In particular, substantial conformance encompasses any regulatory determination that a particular part or structure is sufficiently similar to, identical to, or the same as a specified blade, vane or airfoil, such that certification or authorization for use is based at least in part on the determination of similarity.

With reference now to FIG. 4, geometry of airfoil 47 is described in terms of Cartesian coordinates defined along axial (y) and circumferential axes (x). The axial (y) and circumferential (x) coordinates, schematically shown in FIG. 4, are normalized by local chord length Y at 50% span. The span location corresponds to a percentage of an overall span distance in the radial direction from a point where airfoil 47 meets inner diameter platform 102 to a point where airfoil 47 meets outer diameter platform 104. The contour of airfoil 47 is set forth in Tables 1, 2 and 3, which provides axial (y) and circumferential (x) coordinates at a cross-section taken at 25%, 50% and 75% span, respectively. Those skilled in the art will readily appreciate that two axial coordinates are given for each circumferential coordinate, one axial coordinate for pressure side 110 (y-PS) and one axial coordinate for suction side 112 (y-SS).

TABLE 1

| 25% Span | | |
|---|---|---|
| x | y-SS | y-PS |
| −0.497 | −0.135 | −0.135 |
| −0.496 | −0.144 | −0.127 |
| −0.494 | −0.151 | −0.121 |
| −0.491 | −0.157 | −0.116 |
| −0.486 | −0.166 | −0.111 |
| −0.480 | −0.175 | −0.106 |
| −0.473 | −0.183 | −0.102 |
| −0.464 | −0.192 | −0.100 |
| −0.453 | −0.201 | −0.098 |
| −0.441 | −0.211 | −0.097 |
| −0.426 | −0.221 | −0.098 |
| −0.410 | −0.233 | −0.100 |
| −0.392 | −0.244 | −0.102 |
| −0.371 | −0.255 | −0.104 |
| −0.349 | −0.265 | −0.103 |
| −0.325 | −0.274 | −0.101 |
| −0.300 | −0.282 | −0.097 |
| −0.273 | −0.287 | −0.091 |
| −0.244 | −0.290 | −0.082 |
| −0.216 | −0.290 | −0.071 |
| −0.187 | −0.287 | −0.058 |
| −0.158 | −0.281 | −0.043 |
| −0.129 | −0.272 | −0.025 |
| −0.100 | −0.260 | −0.006 |
| −0.071 | −0.245 | 0.015 |
| −0.042 | −0.227 | 0.038 |
| −0.013 | −0.205 | 0.062 |
| 0.016 | −0.181 | 0.088 |
| 0.045 | −0.153 | 0.116 |
| 0.074 | −0.123 | 0.145 |
| 0.103 | −0.088 | 0.175 |
| 0.132 | −0.051 | 0.206 |
| 0.161 | −0.010 | 0.238 |
| 0.190 | 0.035 | 0.271 |
| 0.218 | 0.081 | 0.305 |
| 0.246 | 0.131 | 0.340 |
| 0.273 | 0.182 | 0.375 |
| 0.298 | 0.233 | 0.409 |
| 0.322 | 0.283 | 0.443 |
| 0.345 | 0.332 | 0.474 |
| 0.365 | 0.379 | 0.504 |
| 0.383 | 0.422 | 0.531 |
| 0.400 | 0.462 | 0.556 |

TABLE 1-continued

25% Span

| x | y-SS | y-PS |
|---|---|---|
| 0.414 | 0.498 | 0.578 |
| 0.427 | 0.530 | 0.598 |
| 0.437 | 0.557 | 0.617 |
| 0.446 | 0.580 | 0.634 |
| 0.453 | 0.598 | 0.647 |
| 0.460 | 0.616 | 0.654 |
| 0.465 | 0.629 | 0.654 |
| 0.467 | 0.636 | 0.652 |
| 0.469 | 0.642 | 0.650 |
| 0.470 | 0.646 | 0.646 |

TABLE 2

50% Span

| x | y-SS | y-PS |
|---|---|---|
| −0.530 | −0.120 | −0.120 |
| −0.529 | −0.129 | −0.111 |
| −0.527 | −0.137 | −0.105 |
| −0.524 | −0.144 | −0.100 |
| −0.519 | −0.153 | −0.095 |
| −0.512 | −0.164 | −0.090 |
| −0.505 | −0.172 | −0.086 |
| −0.496 | −0.181 | −0.084 |
| −0.485 | −0.192 | −0.082 |
| −0.472 | −0.203 | −0.082 |
| −0.457 | −0.215 | −0.083 |
| −0.440 | −0.227 | −0.086 |
| −0.421 | −0.240 | −0.090 |
| −0.400 | −0.253 | −0.092 |
| −0.377 | −0.264 | −0.093 |
| −0.352 | −0.275 | −0.091 |
| −0.326 | −0.283 | −0.087 |
| −0.298 | −0.289 | −0.081 |
| −0.269 | −0.293 | −0.072 |
| −0.240 | −0.293 | −0.061 |
| −0.210 | −0.291 | −0.047 |
| −0.180 | −0.285 | −0.031 |
| −0.150 | −0.277 | −0.013 |
| −0.120 | −0.265 | 0.007 |
| −0.090 | −0.251 | 0.029 |
| −0.060 | −0.233 | 0.052 |
| −0.030 | −0.212 | 0.077 |
| 0.000 | −0.187 | 0.104 |
| 0.030 | −0.160 | 0.133 |
| 0.060 | −0.129 | 0.162 |
| 0.090 | −0.094 | 0.193 |
| 0.120 | −0.056 | 0.225 |
| 0.150 | −0.014 | 0.258 |
| 0.180 | 0.032 | 0.293 |
| 0.209 | 0.080 | 0.328 |
| 0.238 | 0.133 | 0.364 |
| 0.266 | 0.187 | 0.401 |
| 0.293 | 0.240 | 0.436 |
| 0.318 | 0.295 | 0.472 |
| 0.341 | 0.347 | 0.505 |
| 0.362 | 0.397 | 0.536 |
| 0.381 | 0.444 | 0.565 |
| 0.398 | 0.487 | 0.591 |
| 0.413 | 0.526 | 0.614 |
| 0.426 | 0.561 | 0.636 |
| 0.437 | 0.591 | 0.655 |
| 0.446 | 0.616 | 0.673 |
| 0.453 | 0.635 | 0.687 |
| 0.460 | 0.655 | 0.695 |
| 0.465 | 0.669 | 0.695 |
| 0.468 | 0.677 | 0.694 |
| 0.470 | 0.683 | 0.691 |
| 0.471 | 0.687 | 0.687 |

TABLE 3

75% Span

| x | y-SS | y-PS |
|---|---|---|
| −0.562 | −0.101 | −0.101 |
| −0.561 | −0.111 | −0.092 |
| −0.559 | −0.119 | −0.085 |
| −0.556 | −0.127 | −0.080 |
| −0.551 | −0.137 | −0.074 |
| −0.544 | −0.148 | −0.069 |
| −0.536 | −0.157 | −0.065 |
| −0.527 | −0.167 | −0.062 |
| −0.516 | −0.178 | −0.061 |
| −0.502 | −0.191 | −0.060 |
| −0.487 | −0.204 | −0.062 |
| −0.469 | −0.218 | −0.065 |
| −0.450 | −0.232 | −0.069 |
| −0.428 | −0.245 | −0.072 |
| −0.404 | −0.258 | −0.073 |
| −0.378 | −0.269 | −0.072 |
| −0.351 | −0.278 | −0.068 |
| −0.323 | −0.285 | −0.062 |
| −0.293 | −0.290 | −0.053 |
| −0.263 | −0.291 | −0.042 |
| −0.232 | −0.289 | −0.028 |
| −0.201 | −0.285 | −0.013 |
| −0.170 | −0.277 | 0.005 |
| −0.139 | −0.266 | 0.026 |
| −0.108 | −0.252 | 0.047 |
| −0.077 | −0.235 | 0.071 |
| −0.046 | −0.215 | 0.097 |
| −0.015 | −0.192 | 0.124 |
| 0.016 | −0.165 | 0.153 |
| 0.047 | −0.135 | 0.183 |
| 0.078 | −0.101 | 0.215 |
| 0.109 | −0.064 | 0.248 |
| 0.140 | −0.021 | 0.282 |
| 0.171 | 0.025 | 0.317 |
| 0.201 | 0.075 | 0.353 |
| 0.231 | 0.130 | 0.391 |
| 0.260 | 0.187 | 0.429 |
| 0.287 | 0.244 | 0.465 |
| 0.313 | 0.302 | 0.502 |
| 0.336 | 0.358 | 0.537 |
| 0.358 | 0.413 | 0.569 |
| 0.378 | 0.463 | 0.599 |
| 0.395 | 0.510 | 0.626 |
| 0.411 | 0.553 | 0.651 |
| 0.424 | 0.591 | 0.674 |
| 0.436 | 0.623 | 0.694 |
| 0.445 | 0.650 | 0.713 |
| 0.452 | 0.672 | 0.728 |
| 0.459 | 0.693 | 0.737 |
| 0.464 | 0.709 | 0.737 |
| 0.468 | 0.718 | 0.735 |
| 0.470 | 0.724 | 0.733 |
| 0.471 | 0.729 | 0.729 |

Those skilled in the art will readily appreciate that an airfoil can be in substantial conformance with the set of Cartesian coordinates set forth in Tables 1-3 by being within ±15% of each coordinate. It is contemplated that the manufacturing tolerance relative to the specified coordinates can be ±3.6% of the axial chord of the airfoil section, e.g. chord length Y. The coordinates define points on a cold, uncoated, stationary airfoil surface. Additional elements such as cooling holes, protective coatings, fillets and seal structures may also be formed onto the specified airfoil surface, or onto an adjacent platform surface, but these elements are not necessarily described by the normalized coordinates.

Recessed portion 114 allows a change in throat distance T with little or no reduction in chord length Y. Those skilled in the art will readily appreciate that a shorter chord length tends to increase airfoil loading and potentially cause higher loss or lower overall performance. Recessed portion also provides the ability to change through distance T between two vanes 47 and overall flow area across all of vanes 47 in a given vane stage, without twisting and bending vanes 47, which is sometimes not permitted on certain vane types due to potential distortion, for example, hollow cooled vanes.

The methods and systems of the present disclosure, as described above and shown in the drawings, provide for vanes with superior properties, such as, increased control over throat distance and increased ease of manufacture. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An airfoil cluster comprising:
   an inner diameter platform;
   an outer diameter platform; and
   a plurality of airfoils extending radially from the inner diameter platform to the outer diameter platform, each airfoil including a leading edge and a trailing edge with an exterior surface therebetween, wherein the exterior surface includes a pressure side, a suction side and a recessed portion on the pressure side adjacent to the trailing edge, wherein the trailing edge is an arcuate surface connecting between the suction side and the pressure side, the pressure side further including a flat non-recessed surface and a flat recessed surface with a continuously curved transition surface therebetween, the flat non-recessed surface and the flat recessed surface being proximate to the trailing edge, the flat recessed surface being part of the recessed portion; and the flat recessed surface is tangent to the arcuate surface of the trailing edge and is at an angle with respect to the flat non-recessed surface, wherein the exterior surface of at least one of the airfoils is formed in substantial conformance with a set of Cartesian coordinates set forth in one of Table 1, Table 2 or Table 3, wherein the Cartesian coordinates are provided by an axial coordinate scaled by a local chord length, a circumferential coordinate scaled by the local chord length, and a span location, wherein the local chord length corresponds to a respective width of each airfoil between the leading and trailing edges at 50% span.

2. The airfoil cluster as recited in claim 1, wherein the plurality of airfoils includes three hollow vanes.

3. The airfoil cluster as recited in claim 1, wherein the plurality of airfoils ranges from two to six hollow vanes.

4. A method for adjusting flow area between airfoils in a cluster:
   manufacturing an airfoil cluster including:
      an inner diameter platform;
      an outer diameter platform; and
      a plurality of airfoils extending radially from the inner diameter platform to the outer diameter platform, each airfoil having a leading edge and a trailing edge, and pressure and suction sides between the leading and trailing edges, wherein manufacturing the airfoil cluster includes generating a recessed portion on the pressure side adjacent to the trailing edge, wherein the trailing edge is an arcuate surface connecting between the suction side and the pressure side, the pressure side further including a flat non-recessed surface and a flat recessed surface with a continuously curved transition surface therebetween, the flat non-recessed surface and the flat recessed surface are proximate to the trailing edge, the flat recessed surface being part of the recessed portion and generating an exterior surface of at least one of the airfoils in substantial conformance with a set of Cartesian coordinates set forth in at least one of Table 1, Table 2 or Table 3, wherein the Cartesian coordinates are provided by an axial coordinate scaled by a local chord length, a circumferential coordinate scaled by the local chord length, and a span location, wherein the local chord length corresponds to a respective width of each airfoil between the leading and trailing edges at 50% span; and wherein the flat recessed surface is tangent to the arcuate surface of the trailing edge and is at an angle with respect to the flat non-recessed surface.

5. The method as recited in claim 4, wherein generating the recessed portion includes at least one of casting or machining.

6. An airfoil comprising:
   an airfoil body including:
      a leading edge and a trailing edge with an exterior surface therebetween, wherein the exterior surface includes a pressure side, a suction side, and a recessed portion on the pressure side adjacent to the trailing edge, the trailing edge being an arcuate surface connecting between the suction side and the pressure side, and the pressure side further includes a flat non-recessed surface and a flat recessed surface with a continuously curved transition surface therebetween, the flat non-recessed surface and the flat recessed surface are proximate to the trailing edge, and the flat recessed surface being part of the recessed portion, and the flat recessed surface is tangent to the arcuate surface of the trailing edge and is at an angle with respect to the flat non-recessed surface; and wherein the exterior surface is formed in substantial conformance with a set of Cartesian coordinates set forth in at least one of Table 1, Table 2 or Table 3, wherein the Cartesian coordinates are provided by an axial coordinate scaled by a local chord length, a circumferential coordinate scaled by the local chord length, and a span location, wherein the local chord length corresponds to a respective width of each airfoil between the leading and trailing edges at 50% span.

7. The airfoil as recited in claim 6, wherein the airfoil body is a hollow vane.

8. An airfoil comprising:
   an airfoil body having a leading edge and a trailing edge with an exterior surface therebetween, wherein the exterior surface includes a recessed portion on a pressure side of the airfoil adjacent to the trailing edge, wherein the exterior surface is formed in substantial conformance with a set of Cartesian coordinates set forth in at least one of Table 1, Table 2 or Table 3, wherein the Cartesian coordinates are provided by an axial coordinate scaled by a local chord length, a circumferential coordinate scaled by the local chord length, and a span location, wherein the local chord length corresponds to a respective width of each airfoil between the leading and trailing edges at 50% span.

9. The airfoil as recited in claim 8, wherein substantial conformance with the set of Cartesian coordinates set forth in Tables 1, 2 and 3 includes values within ±15% of each coordinate.

10. The airfoil as recited in claim 8, wherein a manufacturing tolerance relative to the set of Cartesian coordinates is ±3.6% of the local chord length of the airfoil body.

\* \* \* \* \*